United States Patent [19]

Kahovec et al.

[11] 4,407,978

[45] Oct. 4, 1983

[54] POLYMERIC POLYDONOR COMPLEXONS AND METHOD FOR PREPARATION THEREOF

[75] Inventors: Jaroslav Kahovec; Zdenek Matejka; Josef Tomasek, all of Prague, Czechoslovakia

[73] Assignee: Ceskoslovenska akademie ved, Liberec, Czechoslovakia

[21] Appl. No.: 437,619

[22] Filed: Oct. 29, 1982

[30] Foreign Application Priority Data

Oct. 29, 1981 [CS] Czechoslovakia ............... 7919-81

[51] Int. Cl.$^3$ ............................................. C08J 9/36
[52] U.S. Cl. ........................................ 521/56; 521/142; 521/146; 521/149; 525/326; 525/329; 525/336; 525/374; 525/382; 525/386; 525/375; 525/328.2; 536/20; 536/30; 536/102; 525/328.8; 525/328.3
[58] Field of Search ............... 521/56, 142, 146, 149; 525/326, 329, 336, 374, 382, 386; 536/20, 30, 102

[56] References Cited

U.S. PATENT DOCUMENTS

| | | | |
|---|---|---|---|
| 3,957,362 | 5/1976 | Mancini et al. | 521/149 |
| 3,997,482 | 12/1976 | Turkova et al. | 521/149 |
| 4,281,233 | 7/1981 | Coupek et al. | 521/149 |

*Primary Examiner*—Morton Foelak

[57] ABSTRACT

Polymeric polydonor complexons having more than six sites in a structural unit are described. The complexons are of the formulae:

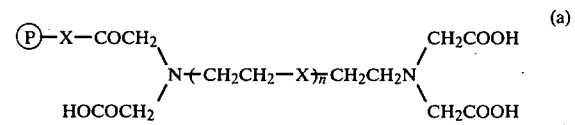

(a)

and

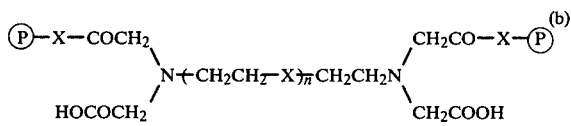

(b)

wherein
Ⓟ is a linear or three-dimensional polymeric skeleton, x is oxygen or an

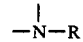

group wherein R is hydrogen, an alkyl group of 1-6 carbon atoms, a phenyl group or a substituted phenyl group. The described complexons are obtained by reaction of a polymeric compound of the formula Ⓟ —XH wherein Ⓟ and X are as defined above with a dianhydride of the corresponding complexon in the presence of a tertiary amine and, optionally, an inert solvent.

4 Claims, No Drawings

POLYMERIC POLYDONOR COMPLEXONS AND METHOD FOR PREPARATION THEREOF

This invention relates to polymeric polydonor complexons and to a method for the preparation thereof. More particularly, the present invention relates to polymeric polydonor complexons having more than six donor sites in a structural unit and to a method for the preparation thereof.

The polymeric complexons have found wide application in several areas within the chemical industry and the and the resins based upon iminodiacetic acid are currently available commercially. Introduction of a chelate-forming group of ethylene-diaminetetra acetic acid (EDTA) into a polymer skeleton has been described in the literature for example, Czechoslovakian Pat. No. 211,634.

In addition to EDTA, the most common complexon, a variety of complexons are known and commonly employed in chemical technology, such complexons manifesting certain advantages such as a high stability of metal chelates as well as selectivity. These properties have been attributed to the presence of a larger number of donor sites in the molecule than that afforded by EDTA. Typical of such complexons are diethylenetriaminepentaacetic acid (DTPA), triethylenetetraminehexaacetic acid (TTHA), 1,2-diaminocyclohexanetetraacetic acid (DCTA), and (ethylene glycol)-bis(2-aminoethyl)ether tetraacetic acid.

Heretofore, the only polymeric polydonor complexons with more than six donor sites described in the literature were compounds of the formula

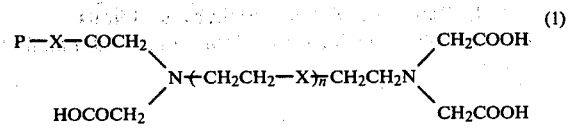

where $P$ represents a styrene-divinylbenzene skeleton and n=2 or 3, such compounds having been prepared by the reaction of a chloromethylated copolymer of styrene-divinylbenzene with diethylenetriamine or triethylenetetraamine and the subsequent carboxymethylation with sodium chloroacetate. Unfortunately, these complexon resins are not chemically homogeneous and greater potential exists for bonding to the polymer carrier with polyamines. Furthermore, the carboxymethylation of the triethylenetetramine derivative is not quantitative (See Blasius, E., Bock I.: J. Chromatog. 14, 244 (1964); Szabadka O., Inczedy J.: Acta Chim. Acad. Sci. Hung. 99, 363 (1979)). Consequently, these complexon resins evidence low efficiency and a deteriorated separation ability.

In accordance with the present invention, the prior art limitations are effectively aliviated by the use of polymeric polydonor complexons with more than six donor sites in a structural unit of the formula

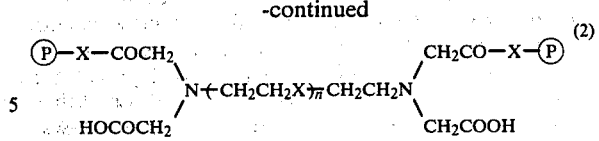

and

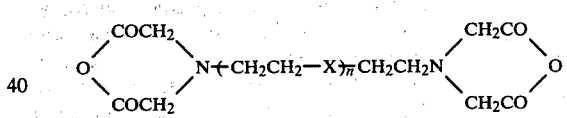

wherein $P$ is a linear or three-dimensional polymeric skeleton, x represents —O— or

wherein H is an alkyl group of 1–6 carbon atoms, a phenyl group or a phenyl group substituted with 1–2 alkyl groups of alkoxyls having 1–6 carbon atoms, Y represents —O—, —S—, or —N— and n is an integer of 1–3.

The polymeric complexons of formulae (1) and (2), described herein, may conveniently be prepared by treating a polymeric compound of the formula $P$—XH where $P$ is the polymeric skeleton and X represents —O— or

as defined above, with a dianhydride of the corresponding complexon in the presence of a tertiary amine and, optionally, an inert solvent. This reaction proceeds smoothly with high yields and no by-product formation.

Suitable dianhydrides of complexons for use in this reaction are of the formula

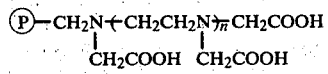

where Y and n are as defined above. Thus, suitable dianhydrides include the dianhydride of diethylenetriaminepentaacetic acid or the dianhydride of (ethylene glycol)-bis(2-aminoethyl)ether tetraacetic acid. The dianhydrides of the complexons may be readily prepared from the corresponding complexons by anhydrization with acetic anhydrides in pyridine.

The polymers $P$ —XH selected for use herein may be natural or synthetic polymers having hydroxy or primary or secondary amino groups, for example, starch, cellulose, chitosan, poly(vinylamine), poly(-vinylamine), or 6-amino-6-deoxycellulose. Crosslinked polymers, either in a gel or macroporous form may also be employed. Typical of such polymers are poly[2-hydroxyethyl methacrylate-co-ethylene dimethacrylate], poly[2-hydroxy-3-aminopropyl methacrylate-co-ethylene dimethacrylate], and poly [vinylbenzylamine-co-divinylbenzene].

The prime advantage of the polycomplexons described herein resides in their chemical and structural homogeneity. Additionally, they are more beneficial than the analogous polymeric complexons based upon EDTA. The higher number of donor sites available with the described polycomplexons result in greater stability of their metal chelates than is attainable with the chelates of analogously immobilized EDTA (See Czechoslovakian Pat. No. 211,634). The subject complexons have also been found to form stronger chelates with metal ions that are obtained with analogous polymers with anchored EDTA. This is clearly evidenced by the sorption of metals from aqueous solution of their EDTA chelates as shown by the table which follows.

TABLE

Sorption of Metals From EDTA Solution
(EDTA: Metal = 2:1; pH = 8.0)

| Complexon Polymer | | Volume Distribution Coefficient (ml/ml) | |
|---|---|---|---|
| | | $Cu^{++}$ | $Ni^{++}$ |
| 1. | Ⓢ - NH—EDTA | 2.60 | 3.49 |
| 2. | Ⓖ - NH—DTPA | 9.25 | 10.30 |
| 3. | Ⓖ - NH(CH₂)₆NH—DTPA | 23.60 | 25.55 |

1 = reaction product of 4-aminophenylsulphonyl-ethyl derivative of poly[2-hydroxyethyl methacrylate -co- ethylene dimethacrylate] with EDTA dianhydride
2 = product of example 2, below
3 = product of example 3, below The complexon polymers described may conveniently be used for recovering heavy metals from electroplating bathes, for removal of heavy metals from waste waters, for concentration and separation of heavy metals in hydrometallurgy and for the separation of metals in analytical chemistry.

Several examples of the practice of the present invention are set forth below. It will be appreciated by those skilled in the art that these examples are set forth solely for purposes of exposition and are not to be construed as limiting.

EXAMPLE 1

A mixture of 3.4 grams of dried bead cellulose, 7.2 grams of the dianhydride of diethylenetriaminetetraacetic acid and 100 ml of anhydrous pyridine was heated to 65 degrees C. for 24 hours. Then, the reaction mixture was diluted with water, the product isolated by filtration and washed several times with the filtrate and water. The product evidenced the following characteristics: N content=3.86%, i.e. 0.92 mmol of bonded DTPA/g; infrared spectrum reveals presence of an ester and carboxylate; sorption of copper=0.85 mmol $Cu^{++}$/g.

EXAMPLE 2

A mixture comprising 13.6 grams of dried macroporous poly[2-hydroxy-3-amino propyl methacrylate-co-ethylene dimethacrylate], containing 1.74 mmol N/g, 10.5 grams of dianhydride of diethylenetriaminepentaacetic acid, and 70 ml of anhydrous pyridine was treated in accordance with the procedure of example 1. The characteristics of the resultant product were: N content=3.84%, i.e. 0.69 mmol of bonded DTPA/g. The infrared spectrum revealed the presence of amide and carboxylate; sorption of copper=0.70 mmol $Cu^{++}$/g.

EXAMPLE 3

A mixture comprising 14 grams of dried macroporous poly[2-hydroxy-3-(6-aminohexylamino)propyl methacrylate-co-ethylene dimethacrylate], prepared by reacting a copolymer of glycidyl methacrylate and ethylene dimethacrylate with 1,6-diaminohexane containing 1.5 mmol of bonded 1,6-diaminohexane/gram, 14 grams of the dianhydride of diethylenetriaminepentaacetic acid and 200 ml of anhydrous pyridine was treated in accordance with the procedure of example 1. The characteristics of the product as produced were: nitrogen content=5.72%; infrared spectrum revealed the presence of an amide and a carboxylate; sorption of copper=0.22 mmol $Cu^{++}$/ml of sorbent.

EXAMPLE 4

A mixture of 3.5 grams of dried bead cellulose, 7 grams of dianhydride of (ethylene glycol)bis(2-aminoethyl)ether tetraacetic acid and 70 ml of anhydrous pyridine was treated in accordance with the procedure of example 1. The product characteristics were as follows: nitrogen content 2.90%, i.e. 1.03 mmol of bonded complexon per gram; infrared spectrum reveals the presence of ester and carboxylate; sorption of copper=0.91 mmol $Cu^{++}$/g.

EXAMPLE 5

The procedure of example 1 was repeated with a mixture comprising 5 grams of a macroporous poly[2-methylaminoethyl methacrylate-co-ethylene dimethacrylate] containing 2.2% nitrogen which was prepared by suspension copolymerization of 2-(4-toluenesulphonyloxy)ethyl methacrylate with ethylene dimethacrylate in the presence of toluene with subsequent amination with aqueous methylamine, 7 grams of dianhydride of diethylenetriaminepentaacetic acid and 100 ml of anhydrous pyridine. The product characteristics were as follows: nitrogen content=4.65%; sorption of copper=0.7 mmol $Cu^{++}$/g.

EXAMPLE 6

A mixture comprising 4 grams of anhydrous bead cellulose, 9 grams of dianhydride of bis[2-(bis(carboxymethyl)imino)ethyl]sulfide and 100 ml of anhydrous pyridine was treated in accordance with the procedure of example 1. The characteristics of the product were as follows: nitrogen content=2.51%; i.e. 0.89 mmol of bonded complexon per gram; infrared spectrum proved the presence of ester and carboxylate; sorption of copper=0.81 mmol $Cu^{++}$/g.

We claim:

1. Polymeric polydonor complexon having more than six donor sites in a structural unit selected from the group consisting of

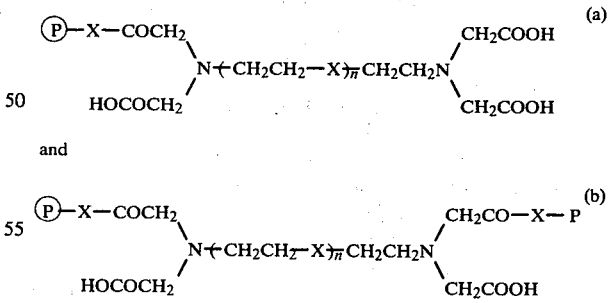

wherein
  Ⓟ is selected from the group consisting of linear and three-dimensional polymeric skeletons;
  X is selected from the group consisting of oxygen and an

group wherein R is selected from the group consisting of hydrogen, and alkyl group of 1-6 carbon atoms, a phenyl group, and a phenyl group substituted with from 1-2 alkyl or alkoxyl groups of 1-6 carbon atoms, Y is selected from the group consisting of oxygen, sulfur and an N—CH$_2$COOH group and n is an integer from 1-3.

2. Method for preparation of complexons in accordance with claim 1, which comprises reacting a compound of the formula ⓟ —XH with a dianhydride of the corresponding complexon in the presence of a tertiary amine, ⓟ being selected from the group consisting of linear and three-dimensional polymeric skeletons, and X representing oxygen or an N—R group wherein R is selected from the group consisting of hydrogen, an alkyl group of 1-6 carbon atoms, a phenyl group and a phenyl group substituted with from 102 alkyls or alkoxyls of 1-6 carbon atoms.

3. Method in accordance with claim 2, wherein said reaction is effected in the presence of an inert solvent.

4. Method in accordance with claim 2 wherein said dianhydride is selected from the group consisting of the dianhydrides of triethylenetetraminehexaacetic acid, diethylenetriaminepentaacetic acid, and (ethylene glycol)-bis(2-aminoethyl)ether tetraacetic acid.

* * * * *